US010394319B2

(12) United States Patent
Kondo

(10) Patent No.: US 10,394,319 B2
(45) Date of Patent: Aug. 27, 2019

(54) METHOD OF DISPLAYING AN IMAGE, AND SYSTEM THEREFOR

(71) Applicant: COLOPL, Inc., Tokyo (JP)

(72) Inventor: Ippei Kondo, Tokyo (JP)

(73) Assignee: COLOPL, INC., Tokyo (JP)

( * ) Notice: Subject to any disclaimer, the term of this patent is extended or adjusted under 35 U.S.C. 154(b) by 172 days.

(21) Appl. No.: 15/337,042

(22) Filed: Oct. 28, 2016

(65) Prior Publication Data

US 2017/0153700 A1   Jun. 1, 2017

(30) Foreign Application Priority Data

Nov. 27, 2015   (JP) .................... 2015-231462

(51) Int. Cl.
*G06F 3/01*   (2006.01)
*G06T 19/00*   (2011.01)

(52) U.S. Cl.
CPC .............. *G06F 3/013* (2013.01); *G06F 3/012* (2013.01); *G06T 19/00* (2013.01)

(58) Field of Classification Search
CPC .......... G06F 3/013; G06F 3/012; G06T 19/00
See application file for complete search history.

(56) References Cited

U.S. PATENT DOCUMENTS 5,850,211 A * 12/1998 Tognazzini ............. G06F 3/013
345/158
6,183,367 B1 * 2/2001 Kaji ...................... A63F 13/12
345/418

2010/0201621 A1 * 8/2010 Niikawa ................. G06F 3/013
345/158
2010/0253676 A1 * 10/2010 Mumbauer ............. G06T 15/20
345/419
2012/0047465 A1 * 2/2012 Noda ...................... G06F 3/011
715/848
2013/0083173 A1 * 4/2013 Geisner ................... G06F 3/013
348/51
2013/0169630 A1 * 7/2013 Kakihara .............. G06F 3/0338
345/419

(Continued)

FOREIGN PATENT DOCUMENTS

JP   2014-115457 A   6/2014
JP   2014-127987 A   7/2014
JP   2015-95045 A   5/2015

OTHER PUBLICATIONS

Office Action in JP Application No. 2015-231462, dated May 24, 2016.

(Continued)

*Primary Examiner* — Sejoon Ahn
(74) *Attorney, Agent, or Firm* — Hauptman Ham, LLP

(57) ABSTRACT

A method of displaying a virtual space image on a head-mounted display. The method includes generating a virtual camera space image based on a virtual camera in a virtual space, which has a perspective different from a perspective associated with the user. The method further includes rendering the virtual camera space image into a display object in the virtual space. The method further includes generating a field-of-view image in which the display object is arranged in the virtual space. The method further includes outputting the field-of-view image to the head-mounted display.

15 Claims, 10 Drawing Sheets

(56) References Cited

U.S. PATENT DOCUMENTS

| | | | |
|---|---|---|---|
| 2013/0329957 A1* | 12/2013 | Ebisawa | A61B 3/113 |
| | | | 382/103 |
| 2014/0066178 A1* | 3/2014 | Kelly | H04N 13/04 |
| | | | 463/25 |
| 2014/0104307 A1* | 4/2014 | Tanaka | G06F 3/005 |
| | | | 345/619 |
| 2014/0160129 A1 | 6/2014 | Sako et al. | |
| 2014/0186002 A1 | 7/2014 | Hanaya et al. | |
| 2015/0068052 A1* | 3/2015 | Krueger | G01C 9/16 |
| | | | 33/301 |
| 2015/0215612 A1* | 7/2015 | Masti Jayaram | G06F 3/012 |
| | | | 348/43 |
| 2015/0273179 A1* | 10/2015 | Krueger | A61M 21/02 |
| | | | 600/27 |
| 2015/0352437 A1* | 12/2015 | Koseki | A63F 13/212 |
| | | | 463/31 |
| 2016/0140768 A1 | 5/2016 | Sako et al. | |
| 2016/0155474 A1 | 6/2016 | Hanaya et al. | |
| 2016/0189429 A1* | 6/2016 | Mallinson | G02B 26/10 |
| | | | 345/633 |
| 2016/0282619 A1 | 9/2016 | Oto et al. | |

OTHER PUBLICATIONS

Office Action in JP Application No. 2015-231462, dated Sep. 27, 2016.

\* cited by examiner

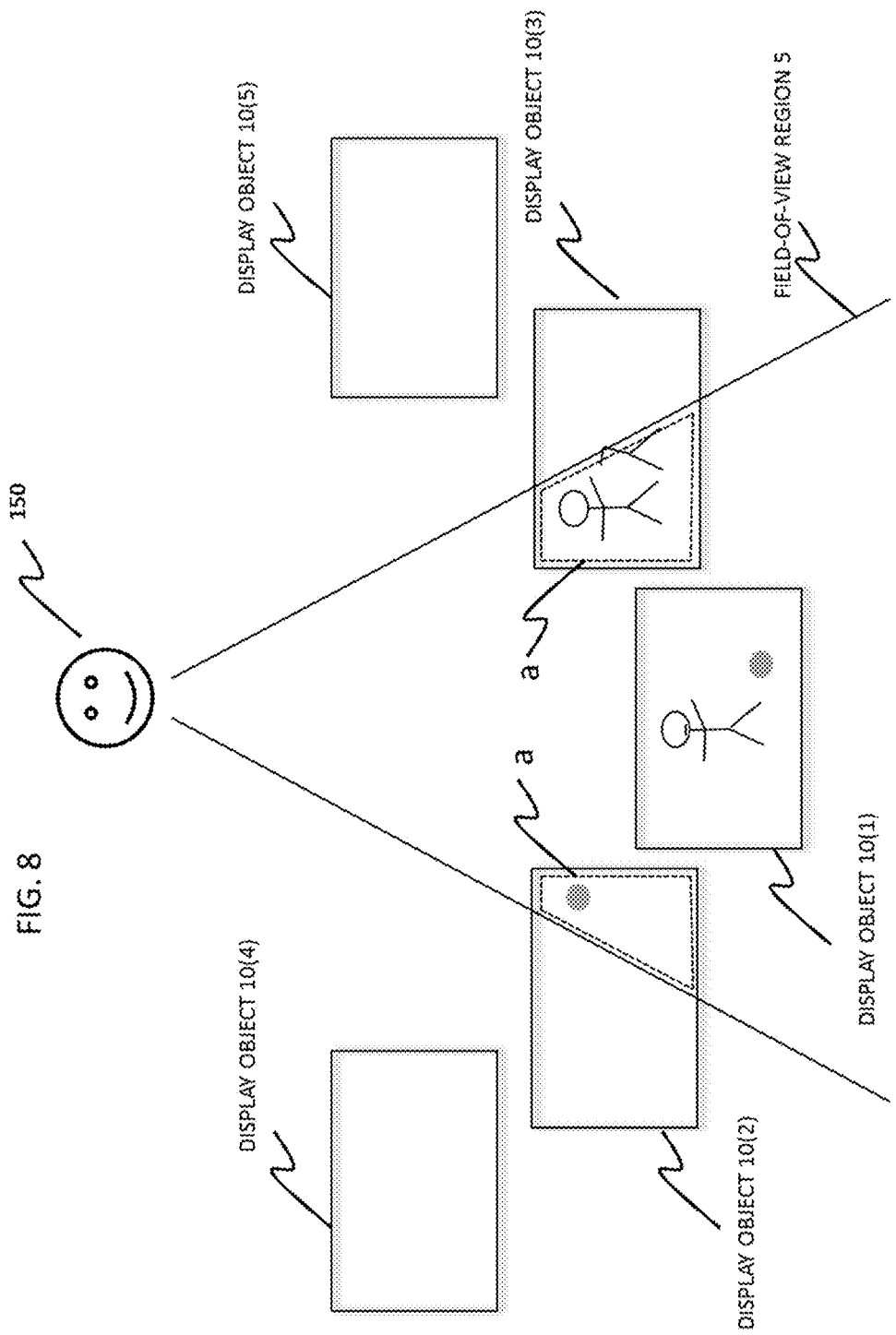

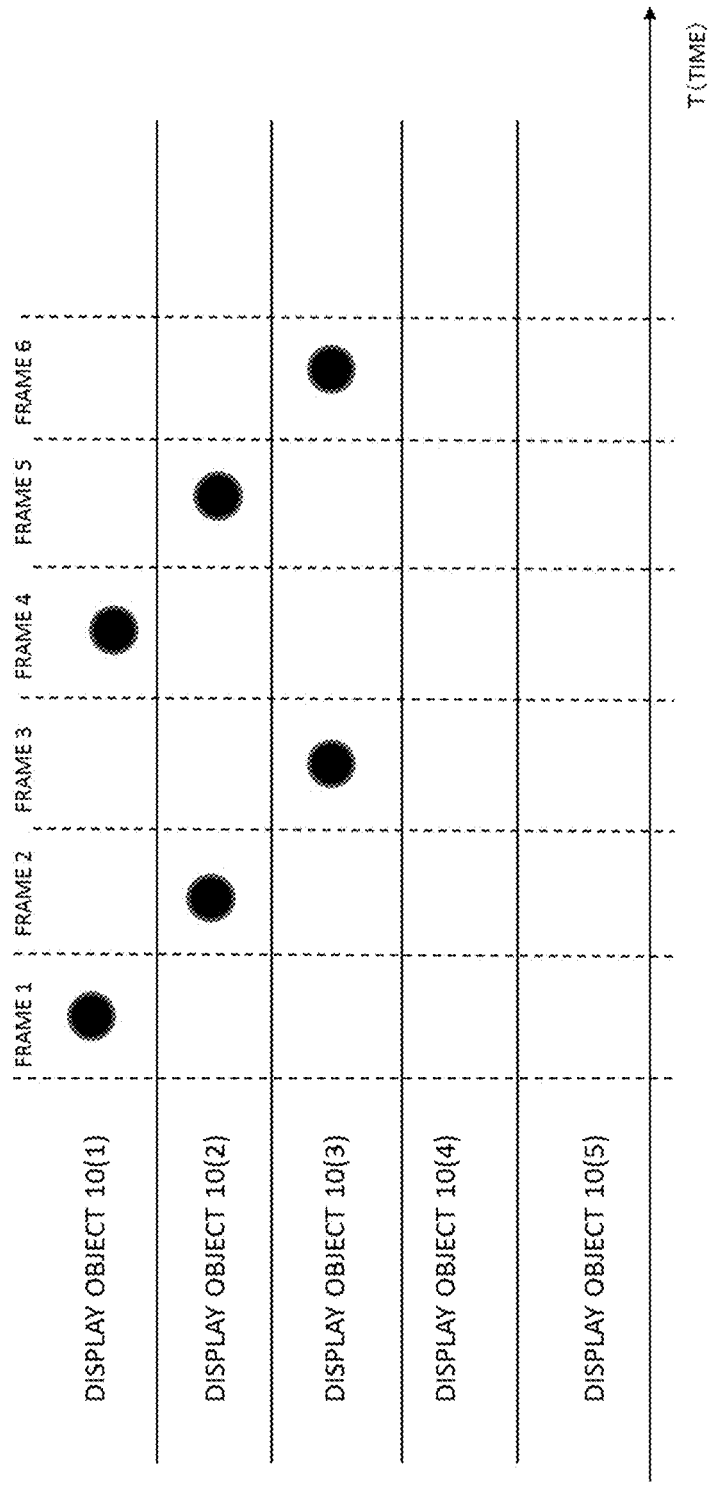

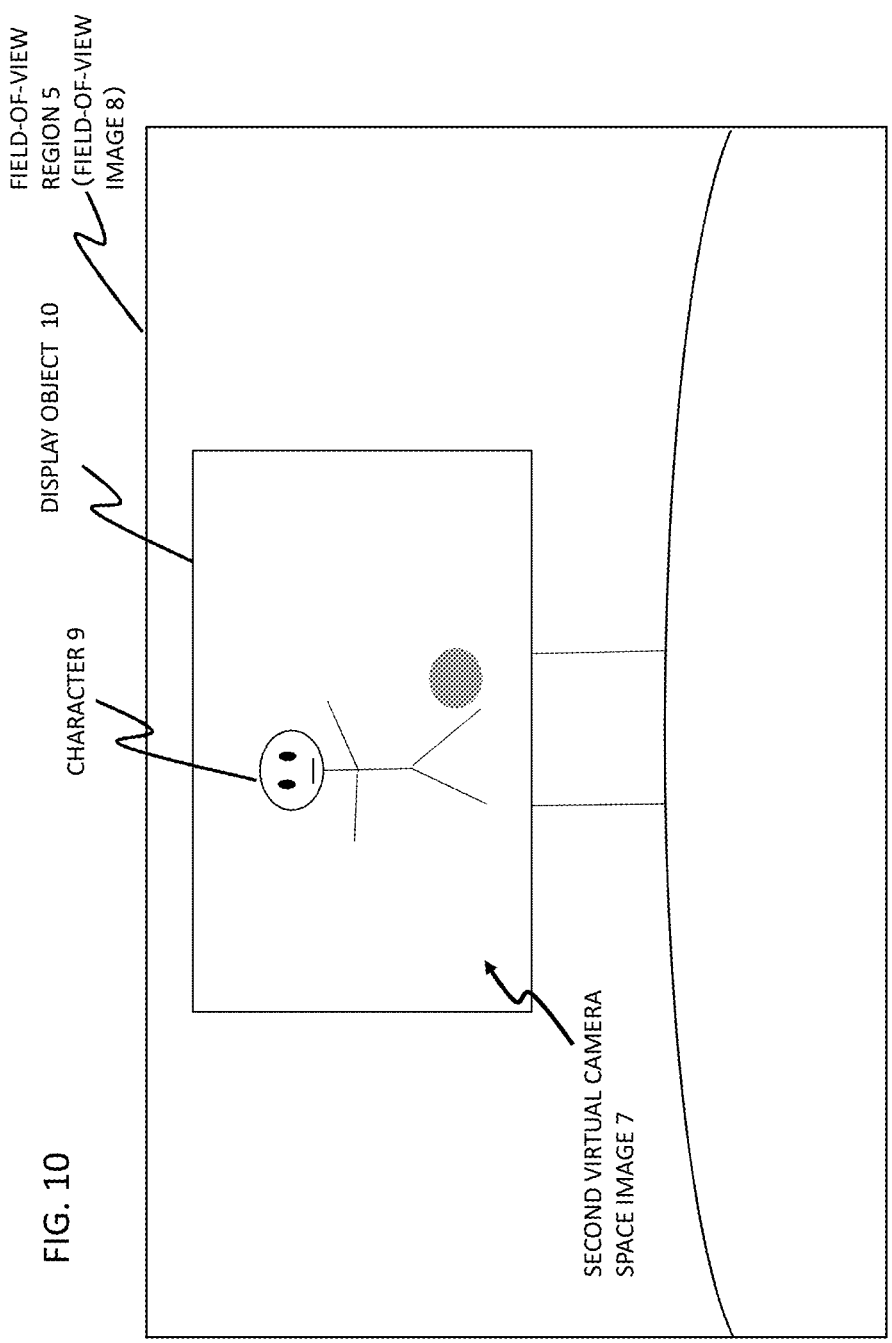

METHOD OF DISPLAYING AN IMAGE, AND SYSTEM THEREFOR

RELATED APPLICATIONS

The present application claims priority to Japanese Patent Application Number 2015-231462, filed Nov. 27, 2015, the disclosure of which is hereby incorporated by reference herein in its entirety.

BACKGROUND

This disclosure relates to a method of displaying an image, and to a system therefor. More specifically, this disclosure relates to a method of displaying an image of a virtual space on a head-mounted display (HMD), and to a system therefor.

In Japanese Patent Application Laid-open No. 2015-95045, an HMD is provided with a head tracking function. Thus, an image synchronized with the movement of a head of a user wearing the HMD is displayed on the HMD.

However, in the HMD system disclosed in Japanese Patent Application Laid-open No. 2015-95045, when the HMD tracking and the display image displayed on the HMD have a poor following property, visually induced motion sickness (so-called virtual reality (VR) sickness) may be caused.

SUMMARY

In order to help solve the above-mentioned problems, according to at least one embodiment of this disclosure, there is provided a method of displaying a virtual space image on a head-mounted display worn by a user. The method includes generating a virtual camera space image taken by a virtual camera (virtual camera 2) in a virtual space, which has a third-person perspective different from a first-person perspective associated with the user. The method further includes rendering the virtual camera space image into a display object in the virtual space. The method further includes generating a field-of-view image in which the display object is arranged in the virtual space. The method further includes outputting the field-of-view image to the head-mounted display.

According to this disclosure, visually induced motion sickness, which is caused when the user receives a visual effect not synchronized with the movement of the HMD, can be reduced.

BRIEF DESCRIPTION OF THE DRAWINGS

FIG. 8 is a diagram of a relationship between a field-of-view region and a plurality of display objects arranged in the virtual space according to at least one embodiment of this disclosure.

FIG. 9 is a table of an update timing to be set for each display object according to at least one embodiment of this disclosure.

FIG. 10 is an example of an image to be displayed in the field-of-view region of the user wearing the HMD according to at least one embodiment of this disclosure.

DESCRIPTION OF THE EMBODIMENTS

Figure 1:
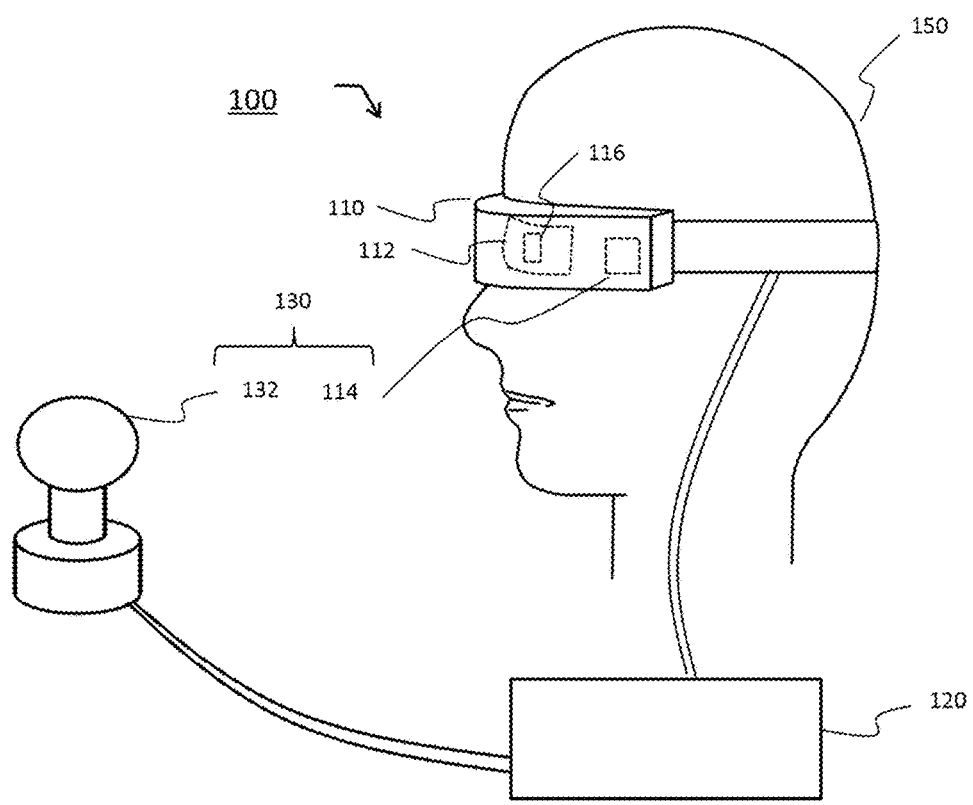
FIG. 1 is a view of an HMD system according to at least one embodiment of this disclosure.

First, at least one embodiment of this disclosure is described with reference to a list of contents thereof. An image display method and a program according to at least one embodiment of this disclosure include the following configurations.

(Item 1) A method of displaying a virtual space image on a head-mounted display worn by a user. The method includes generating a virtual camera space image taken by a virtual camera in a virtual space, which has a third-person perspective different from a first-person perspective associated with the user. The method further includes rendering the virtual camera space image into a display object in the virtual space. The method further includes generating a field-of-view image in which the display object is arranged in the virtual space. The method further includes outputting the field-of-view image to the head-mounted display.

(Item 2) A method according to Item 1, further including determining a predetermined timing at which the virtual camera space image is rendered. The method further includes rendering the virtual camera space image into the display object at the predetermined timing.

(Item 3) A method according to Item 1, in which the rendering of the virtual camera space image into the display object is carried out when it is determined that the virtual camera space image corresponds to a predetermined scene for performing rendering into the display object.

(Item 4) A method according to Item 1, in which the virtual camera includes a plurality of virtual cameras, which are arranged at different positions in the virtual space. The display object includes a plurality of display objects, which are arranged at different positions in the virtual space. Each of the plurality of display objects corresponds to one of the plurality of virtual cameras.

(Item 5) A method according to Item 4, further including specifying a reference line of sight of the user wearing the head-mounted display. The method further includes determining a field-of-view region of the user based on the reference line of sight. The virtual camera space image is rendered into, of the plurality of display objects, a display object arranged in the field-of-view region, and is prevented from being rendered into, of the plurality of display objects, a display object arranged outside of the field-of-view region.

(Item 6) A method according to Item 5, further including updating, when there are a plurality of display objects in the field-of-view region, the plurality of display objects in the field-of-view region at different timings.

(Item 7) A method according to Item 5, in which the specifying of the reference line of sight of the user is carried out based on at least one of an inclination of the head-mounted display or a line-of-sight direction of the user, which is specified by an eye gaze sensor of the head-mounted display.

(Item 8) A system for executing the method of any one of Items 1 to 7.

Specific examples of a system for controlling a head-mounted display system according to at least one embodiment of this disclosure are described below with reference to the drawings. This disclosure is not limited to those examples, and is defined by the scope of claims. This disclosure includes modifications within the scope of claims and the equivalents thereof. In the following description, like elements are denoted by like reference symbols in the description of the drawings, and redundant description thereof is omitted.

[Outline of HMD System 100]

FIG. 1 is a view of an HMD system 100 including an HMD 110 according to at least one embodiment. The HMD system 100 includes the HMD 110 to be worn on a head of a user 150, a control circuit unit 120, and a tracking sensor 132.

The HMD 110 includes a display 112 that is a non-transmissive, or partially transmissive, display device, a sensor unit 114, and an eye gaze sensor 116. The control circuit unit 120 is configured to cause the display 112 to display a right-eye image and a left-eye image, to thereby provide a three-dimensional image using binocular parallax as a virtual space. The display 112 is arranged right in front of the user's 150 eyes, and thus the user 150 can be immersed to the virtual space. The virtual space includes a background, various objects that can be operated by the user, menu images, and the like.

The display 112 may include a right-eye sub-display configured to provide a right-eye image, and a left-eye sub-display configured to provide a left-eye image. Further, as long as the right-eye image and the left-eye image can be provided, the display 112 may be constructed of one display device. For example, a shutter configured to enable recognition of a display image with only one eye may be switched at high speed, to thereby independently provide the right-eye image and the left-eye image.

Figure 2:
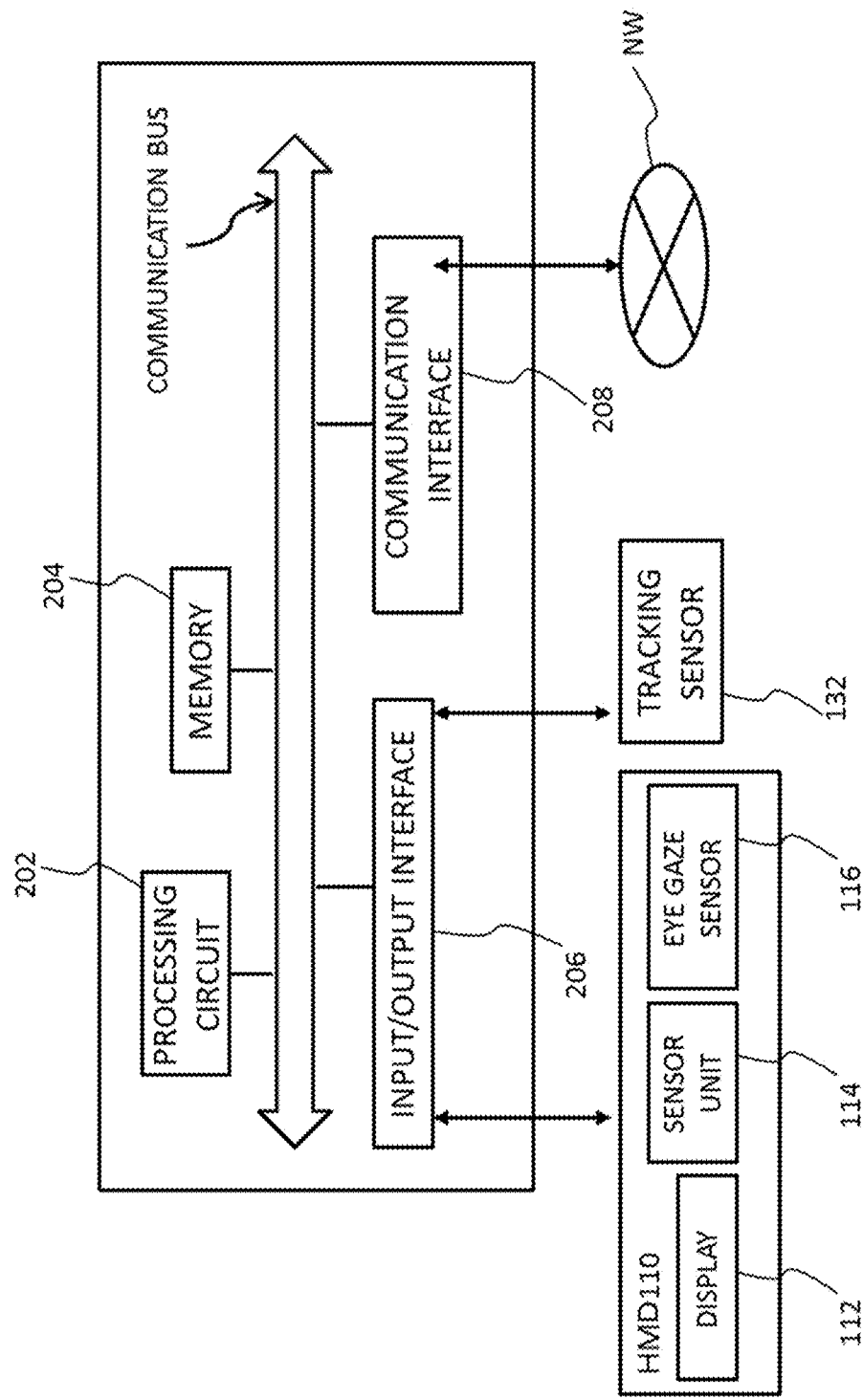
FIG. 2 is a diagram of a hardware configuration of a control circuit unit according to at least one embodiment of this disclosure.

The control circuit unit 120 is a computer to be connected to the HMD 110. As illustrated in FIG. 2, the control circuit unit 120 includes a processing circuit 202, a memory 204, an input/output interface 206, and a communication interface 208. The processing circuit 202, the memory 204, the input/output interface 206, and the communication interface 208 are connected to each other with a bus used as a data transmission path.

The processing circuit 202 includes various processing circuits such as a central processing unit (CPU), a micro-processing unit (MPU), and a graphics processing unit (GPU), and has a function of controlling the entire control circuit unit 120 and HMD system 100.

The memory 204 includes a read only memory (ROM), a random access memory (RAM), or the like, and is configured to store programs to be used by the processing circuit and control data such as calculation parameters. The memory further includes non-volatile storage devices, such as a flash memory or a hard disc drive (HDD), and is configured to store data relating to various images and objects, simulation programs, or user authentication programs, and may further be configured to construct a database including tables for managing various kinds of data.

The input/output interface 206 includes various wire connection terminals, such as a universal serial bus (USB) terminal, a digital visual interface (DVI) terminal, or a high-definition multimedia interface (HDMI) (trademark) terminal, and various processing circuits for wireless connection. The input/output interface 206 is configured to connect the HMD 110, various sensors including a movement sensor 130, an external controller, and the like to each other.

The communication interface 208 includes various wire connection terminals for communicating to/from an external device via a network NW, and various processing circuits for wireless connection. The communication interface 208 is configured to adapt to various communication standards or protocols for communication via a local area network (LAN) or the Internet.

The control circuit unit 120 is configured to execute a predetermined application stored in the memory, to thereby present a virtual space on the display 112. Further, the memory stores a program for operating various objects displayed in the virtual space, or for displaying and controlling various menu images and the like. In at least one embodiment, the control circuit unit 120 is not required to be mounted on the HMD 110, and may be constructed as different hardware (for example, a known personal computer, or a server computer via a network). Further, in at least one embodiment, only a part of the functions of the control circuit unit 120 may be mounted on the HMD 110, and the remaining functions thereof may be mounted on different hardware.

The movement sensor 130 is configured to detect information relating to a position and inclination of the HMD 110. The movement sensor 130 includes the sensor unit 114 and the tracking sensor 132. The sensor unit 114 may include a plurality of light sources. The light source is, for example, an LED configured to emit an infrared ray. The tracking sensor 132 is, for example, an infrared sensor, and is configured to detect the infrared ray from the light source as a detection point of the HMD 110, to thereby detect over time information relating to a position and angle in a real space of the HMD 110 based on the movement of the user 150. Then, the time change of the position and angle of the HMD 110 can be detected based on the temporal change of the information detected by the tracking sensor 132, and thus information relating to the movement of the HMD 110 can be detected.

Figure 3:
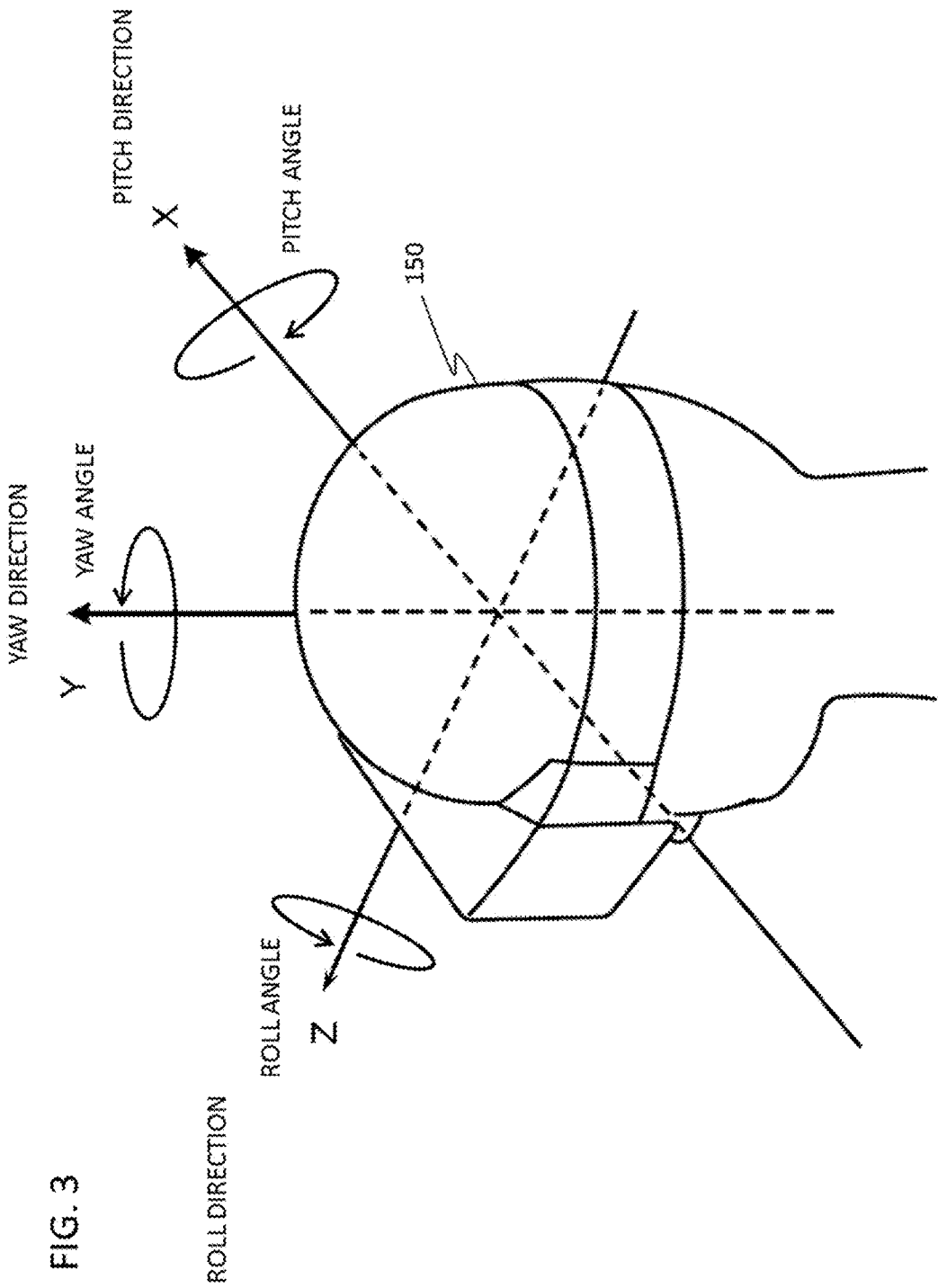
FIG. 3 is an illustration of an orthogonal coordinate system on a three-dimensional space defined about a head of a user wearing an HMD.

The information relating to the position and inclination acquired by the movement sensor 130 is described with reference to FIG. 3. A three-dimensional coordinate system is defined about the head of the user 150 wearing the HMD 110. A perpendicular direction in which the user stands upright is defined as a yaw direction, a front-rear direction being orthogonal to the yaw direction and connecting between the user and the center of the display 112 is defined as a roll direction, and a lateral direction orthogonal to the yaw direction and the roll direction is defined as a pitch direction. With this, the temporal change in position of the user in the three-dimensional space is acquired. Further, a pitch angle being an inclination angle of the HMD 110 about the pitch direction, a yaw angle being an inclination angle of the HMD 110 about the yaw direction, and a roll angle being an inclination angle of the HMD 110 about the roll direction are acquired.

The movement sensor 130 may be constructed a single tracking sensor 132 and the sensor unit 114 fixed near the display 112. In at least one embodiment, the movement sensor 130 includes multiple tracking sensors. The sensor unit 114 may be a geomagnetic sensor, an acceleration sensor, or a gyroscope, and is configured to use at least one of those sensors to detect the position and inclination of the HMD 110 (in particular, the display 112) worn on the head of the user 150. With this, the information relating to the movement of the HMD 110 can be detected. For example, the angular velocity sensor can detect over time the angular velocity about three axes of the HMD 110 based on the movement of the HMD 110, and can determine the time change of the angle about each axis. In at least one embodiment, the detection unit 132 may be omitted. Further, the detection unit 132 may include an optical camera. In this case, the information relating to the movement of the HMD 110 can be detected based on the image information, and thus the sensor unit 114 may be omitted in at least one embodiment.

The eye gaze sensor 116 has an eye tracking function of detecting directions of the lines of sight of the right and left eyes of the user 150. In at least one embodiment, the eye gaze sensor 116 includes a right-eye sensor and a left-eye sensor, which are respectively configured to detect the directions of the lines of sight of the right and left eyes, to thereby detect a line-of-sight direction in which the user 150 focuses his/her gaze. The eye gaze sensor 116 can employ a sensor having an eye tracking function. For example, infrared light may be radiated to each of the right eye and the left eye to acquire reflection light from the cornea or the iris, to thereby obtain a rotational angle of the eyeball.

The eye gaze sensor 116 is configured to detect the line-of-sight directions of the right and left eyes of the user 150, to thereby specify a point of gaze being an intersection of both directions. The point of gaze specified when the user is looking at a near place is closer to the user than the point of gaze specified when the user is looking at a far place. When the point of gaze is specified, the line-of-sight direction of the user 150 is specified. The line-of-sight direction is a direction in which the line of sight of the user 150 is actually directed with both eyes. The line-of-sight direction is defined as, for example, an extension direction of a straight line, which passes through the point of gaze and a midpoint of the user's right and left eyes.

Figure 4:
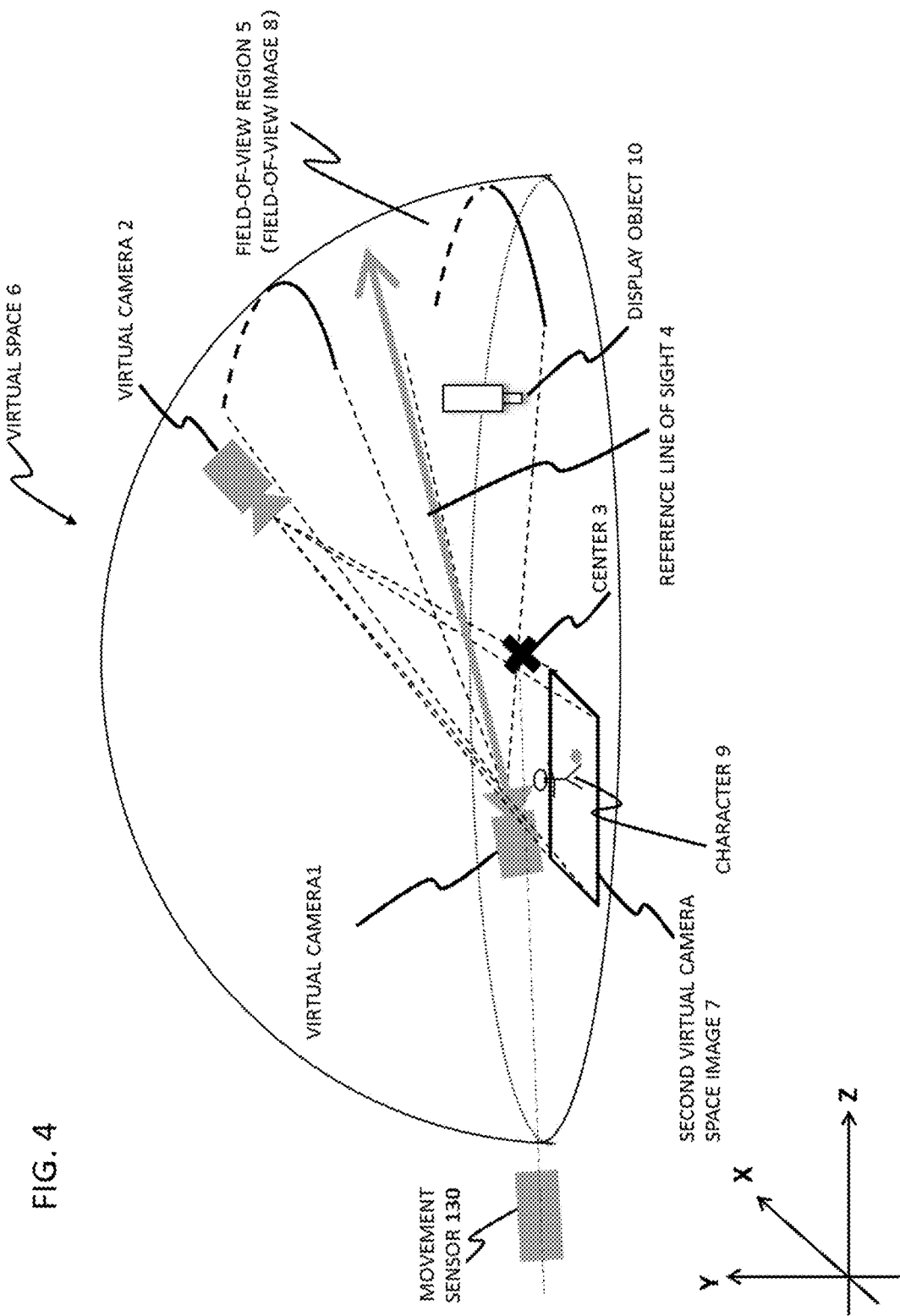
FIG. 4 is an XYZ space diagram for illustrating at least one example of a virtual space.

FIG. 4 is an XYZ space diagram for illustrating an example of a virtual space according to at least one embodiment of this disclosure. In FIG. 4, an XZ plane represents the ground surface, and a Y axis extends in a height direction. As illustrated in FIG. 4, a virtual space 6 is formed into a celestial sphere shape with a center 3 being a center. In the virtual space 6, a virtual camera 1 and a virtual camera 2 are arranged. The virtual camera 1 and the virtual camera 2 are each configured to take an image in the virtual space 6. The movement of the virtual camera 1 is associated with the movement of the movement sensor 130, and the image to be taken by the virtual camera 1 changes due to the movement of the movement sensor 130. The virtual camera 1 has a first-person perspective of the user 150, or a perspective associated with an avatar of the user. Meanwhile, the virtual camera 2 is arranged at a position in the virtual space different from the position of the virtual camera 1, and has a third-person perspective different from the first-person perspective associated with the user. In at least one embodiment, the position of the virtual camera 2 in the virtual space is not limited and could be arranged at any position.

In FIG. 4, the virtual camera 1 takes a field-of-view image 8 in a field-of-view region 5 based on a reference line of sight 4, and the virtual camera 2 takes a second virtual camera space image 7. The second virtual camera space image 7 is, for example, an image including a ball and a character 9 playing a soccer game in the virtual space 6. In the field-of-view image 8, a display object 10 in which the second virtual camera space image 7 is rendered is arranged. A specific method of generating the field-of-view image 8 is described later.

Next, with reference to FIG. 4, the relationship between the movement sensor 130 and the virtual camera 1 arranged in the virtual space 6 is described. In order to describe the positional relationship between the virtual camera 1 and the movement sensor 130, in the following, the position of the movement sensor 130 is set as the position of the tracking sensor 132 when the tracking sensor 132 is included, and is set as the position of the sensor unit 114 when the tracking sensor 132 is not included.

In at least one embodiment, in the XZ plane, the center 3 of the celestial sphere is adjusted to always be arranged on a line connecting between the virtual camera 1 and the sensor 130. For example, the virtual camera 1 may always be arranged at the center 3. Further, when the user 150 wearing the HMD 110 moves such that the position of the virtual camera 1 moves in the X direction, the region of the virtual space 6 may be changed such that the center 3 is positioned on the extension line between the virtual camera 1 and the movement sensor 130. In those cases, the position of the virtual camera 1 in the virtual space 6 is fixed, and only the inclination thereof changes. Meanwhile, when the position of the virtual camera 1 is moved in association with the movement of the movement sensor 130 in a direction, the position of the virtual camera 1 in the virtual space 6 is set based on the direction.

Figure 5:
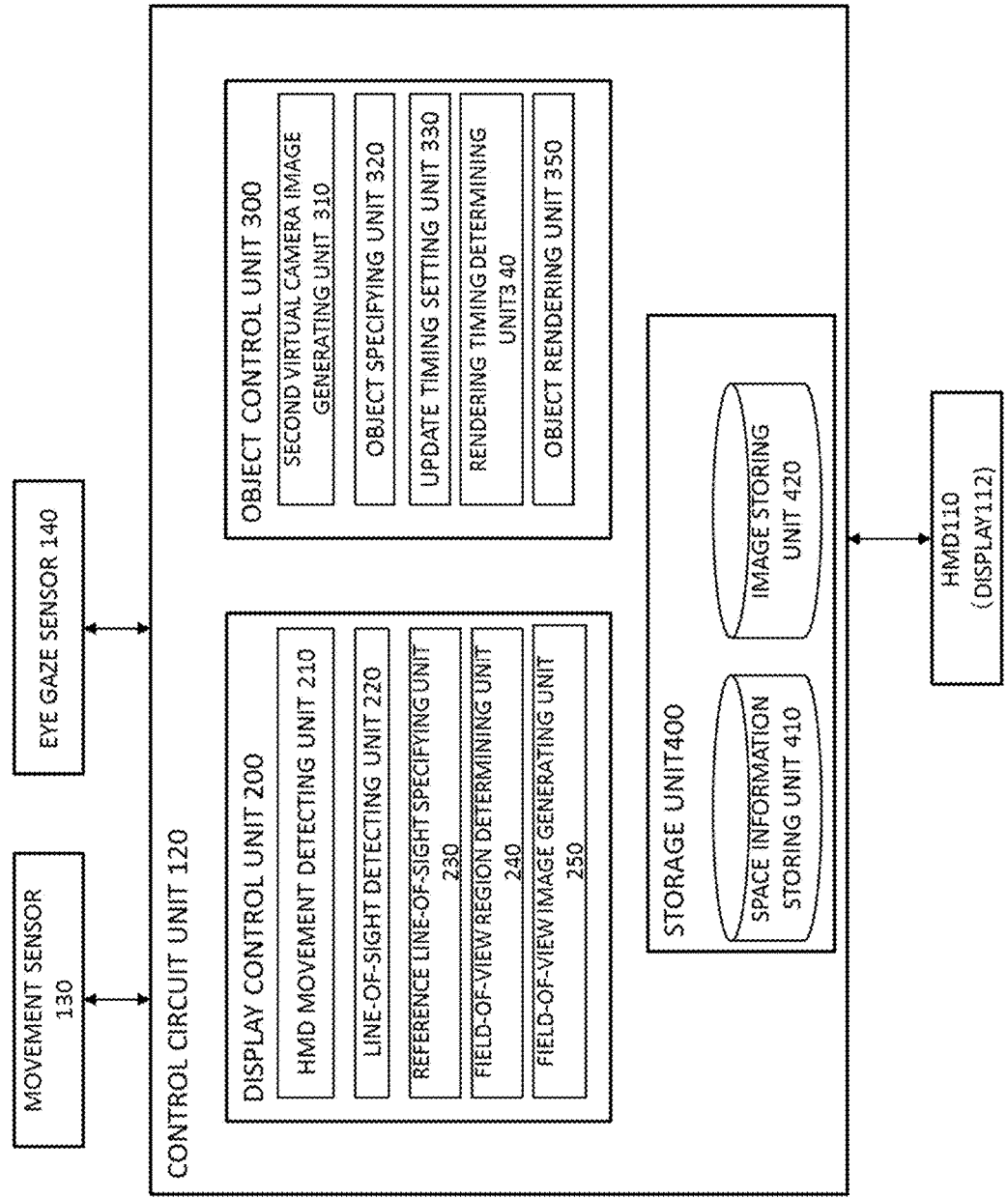
FIG. 5 is a block diagram of a function of a control circuit unit for an HMD system according to at least one embodiment of this disclosure.

FIG. 5 is a block diagram of the function of the control circuit unit 120 for performing display processing of the virtual space 6 in the HMD system 100 or performing rendering of the display object to be displayed in the virtual space 6. The control circuit unit 120 is configured to control an output image to the display 112 mainly based on the input from the movement sensor 130 and the eye gaze sensor 116.

The control circuit unit 120 includes a display control unit 200, an object control unit 300, and a storage unit 400. The display control unit 200 includes an HMD movement detecting unit 210, a line-of-sight detecting unit 220, a reference line-of-sight specifying unit 230, a field-of-view region determining unit 240, and a field-of-view image generating unit 250. The object control unit 300 includes a second virtual camera image generating unit 310, an object specifying unit 320, an update timing setting unit 330, a rendering timing determining unit 340, and an object rendering unit 350. The storage unit 400 includes a space information storing unit 410 and an image storing unit 420. The storage unit 400 further includes various kinds of data necessary for calculation for providing, to the display 112, output information corresponding to the input from the movement sensor 130 or the eye gaze sensor 116. The storage unit 400 corresponds to the memory 204 illustrated in FIG. 2.

Figure 6:
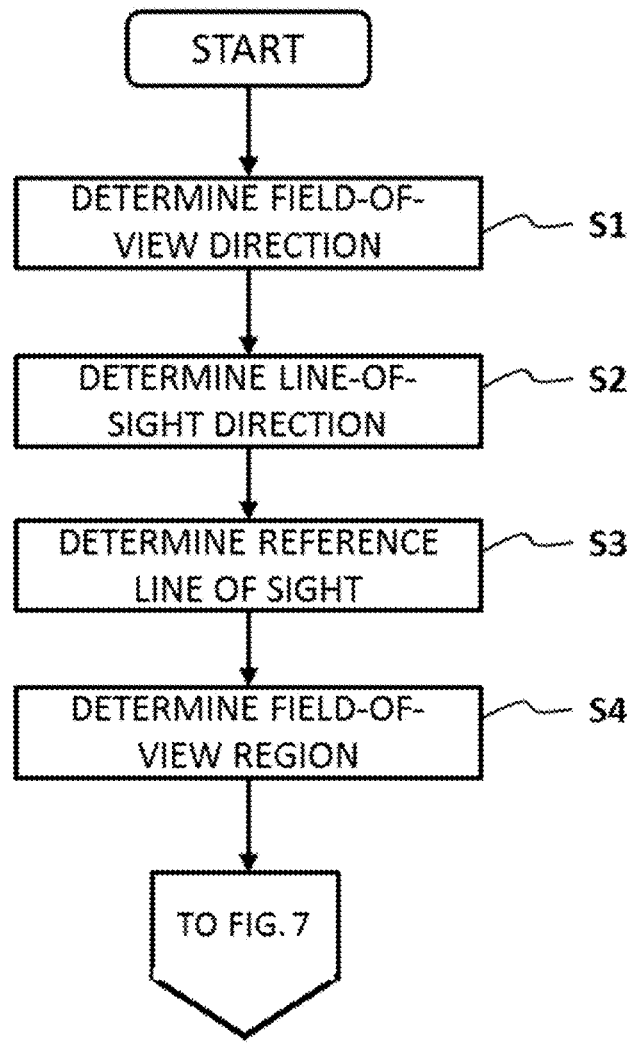
FIG. 6 is a flowchart for a method of processing for achieving the function of the HMD system according to at least one embodiment of this disclosure.

First, with reference to FIG. 4 to FIG. 6, a processing flow for determining the field-of-view region 5 corresponding to the virtual camera 1 is described. The virtual space 6 may be provided through interactions among of the HMD 110, the eye gaze sensor 116, the movement sensor 130, and the control circuit unit 120.

First, the HMD movement detecting unit 210 acquires position information and inclination information of the HMD 110 detected by the movement sensor 130, and determines the field-of-view direction of the user 150 based on the position information and the inclination information of the HMD 110 (Step S1).

Next, the line-of-sight detecting unit 220 acquires information relating to the movement of the right and left eyeballs of the user 150 detected by the eye gaze sensor 116, and specifies the line-of-sight direction of the user based on the information relating to the movement of the eyeballs of the user (Step S2).

Next, the reference line-of-sight specifying unit 230 specifies the reference line of sight 4 based on the field-of-view direction specified based on the inclination of the HMD 110, and/or the line-of-sight direction of the user 150 (Step S3). For example, a straight line connecting between the midpoint of the right and left eyes of the user 150 and the middle of the display 112 positioned in the field-of-view direction is specified as the reference line of sight 4. Further, for example, the line-of-sight direction of the user specified by the eye gaze sensor 116 is specified as the reference line of sight 4.

Next, the field-of-view region determining unit 240 determines the field-of-view region 5 of the virtual camera 1 in the virtual space 6 based on the reference line of sight 4 (Step S4). The field-of-view region 5 includes a first region defined by the reference line of sight 4 and the YZ cross section of the virtual space 6, and a second region defined by the reference line of sight 4 and the XZ cross section of the virtual space 6. The first region is set as a range including a predetermined polar angle with the reference line of sight 4 being the center. The second region is set as a range including a predetermined azimuth with the reference line of sight 4 being the center. As illustrated in FIG. 4, the field-of-view region 5 of the virtual camera 1 is a part of the virtual space 6, which forms the field of view of the user 150. The field-of-view region 5 is associated with the inclination of the HMD 110, and/or the line-of-sight direction of the user 150.

Figure 7:
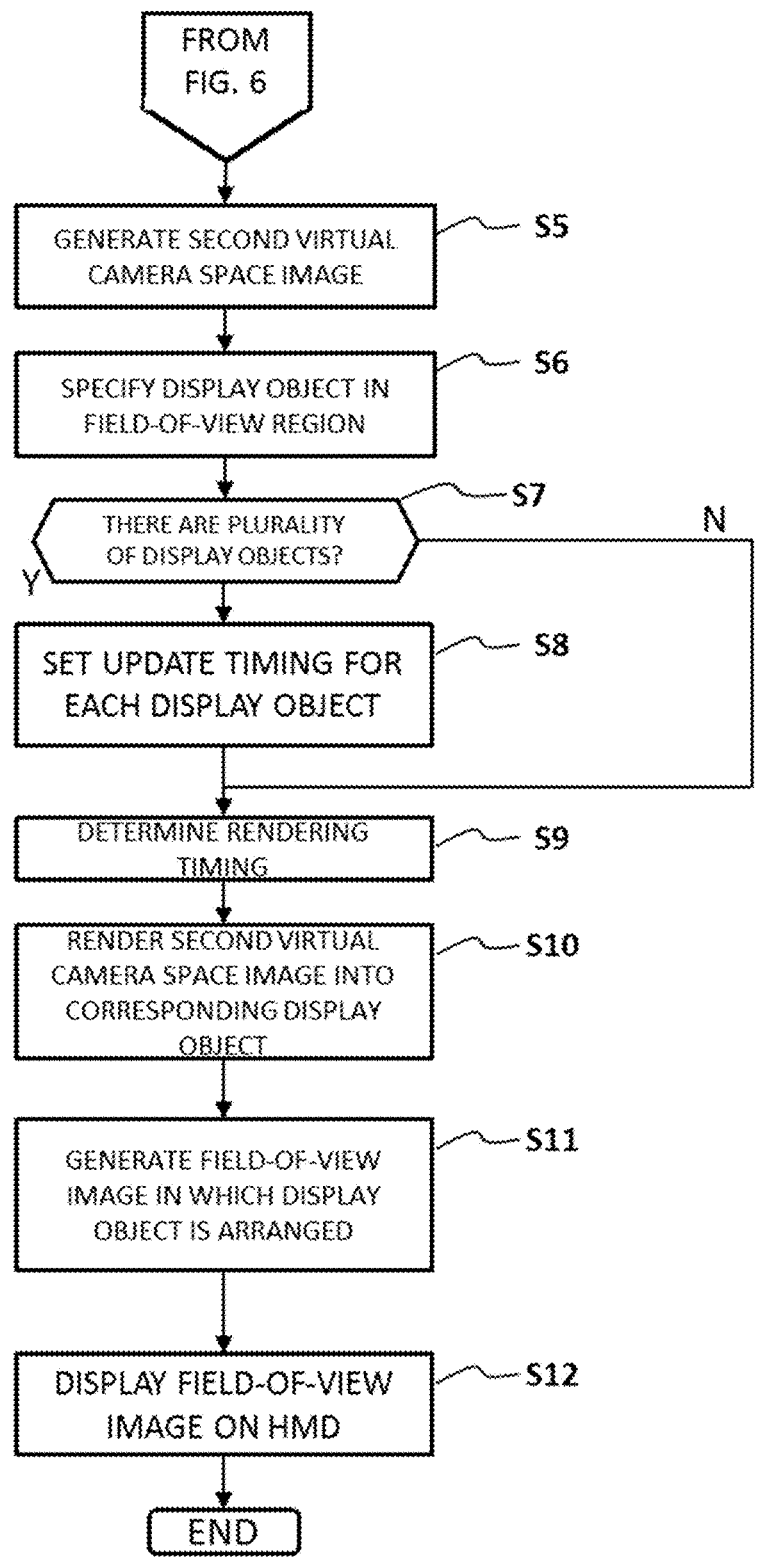
FIG. 7 is a flowchart for a method of processing for achieving the function of the HMD system according to at least one embodiment of this disclosure.

Next, with reference to FIG. 4, FIG. 5, and FIG. 7, a processing flow for generating the field-of-view image 8 in the field-of-view region 5 with use of an image taken by the virtual camera 2 is described.

First, the second virtual camera image generating unit 310 generates the second virtual camera space image 7 taken by the virtual camera 2 (Step S5). The virtual camera 2 takes an image/video of an application (for example, a soccer game) performed in the virtual space in a third-person perspective.

Then, the image storing unit 420 stores the generated second virtual camera space image 7. The image storing unit 420 may store the taken second virtual camera space image only for a predetermined period and sequentially delete the image after the predetermined period has elapsed so as to reduce the memory load. When there are a plurality of virtual cameras 2, the image storing unit 420 stores each image taken by each of the plurality of virtual cameras.

The image storing unit 420 may further store only the second virtual camera space image of a predetermined scene, for example, a replay image of a scene corresponding to a period from immediately before the character 9 scores a goal in a soccer game until the character 9 returns to the character's starting position. When the object rendering unit 350 described later determines not to render the stored replay image, the image storing unit 420 may delete the image from the memory. In at least one embodiment, the image storing unit sequentially deletes the image from the memory.

Next, the object specifying unit 320 specifies the display object 10 in the field-of-view region 5 based on the field-of-view region 5 determined in Step S4 (Step S6). The display object 10 is an object for display in the virtual space, in which the image taken by the virtual camera 2 is rendered, and is arranged at a position in the virtual space 6.

Next, the object specifying unit 320 determines whether or not there is a plurality of display objects 10 in the field-of-view region 5 (Step S7). When a plurality of display objects are not present in the field-of-view region 5, the processing proceeds to Step S9. On the other hand, when there is a plurality of display objects in the field-of-view region 5, the update timing setting unit 330 sets an update timing for each of the display objects (Step S8).

FIG. 8 is an illustration of a relationship between the field-of-view region 5 and a plurality of display objects 10(1) to 10(5) arranged at different positions in the virtual space 6. The plurality of display objects are each associated with one of the plurality of virtual cameras 2 arranged at different positions in the virtual space. As illustrated in FIG. 8, the entire display object 10(1) is arranged in the field-of-view region 5, and only a part (a) of each of the display objects 10(2) and 10(3) are arranged in the field-of-view region 5. The display objects 10(4) and 10(5) are present outside of the field-of-view region. The plurality of display objects may be associated with one virtual camera 2, or one display object may be associated with a plurality of virtual cameras 2.

FIG. 9 is a table for showing the update timing to be set for each display object. When at least a part of a display object is included in the field-of-view region 5, the update timing setting unit 330 sets the display object as an update target to set the update timing thereof. For example, the update timing setting unit 330 sets the display objects 10(1) to 10(3) in the field-of-view region 5 as update targets to set the update timings thereof. Then, the update timing setting unit 330 sets, for example, the update timing of the display object 10(1) to frames 1 and 4, the update timing of the display object 10(2) to frames 2 and 5, and the update timing of the display object 10(3) to frames 3 and 6. The plurality of display objects 10(1) to 10(3) in the field-of-view region 5 are not simultaneously updated. The update timing is set such that, for example, one display object is updated for each frame. The update timings of the display objects 10(4) and 10(5) present outside of the field-of-view region 5 are not set.

Next, the rendering timing determining unit 340 determines a predetermined timing at which the second virtual camera space image 7 is rendered into the display object 10 (Step S9). For example, when a soccer game is played, the rendering timing determining unit 340 determines a timing at which a player character scores a goal and then the player character returns to the character's starting position as the predetermined timing at which the second virtual camera space image 7 is rendered into the display object 10. The second virtual camera space image 7 is rendered into the display object 10 from the predetermined timing. With this, a period in which the second virtual camera space image 7 is rendered into the display object 10 is shortened, and a load required for the rendering processing of the display object 10 can be reduced. The rendering timing determining unit 340 may render the second virtual camera space image 7 into the display object 10. In at least one embodiment, the rendering timing determining unit 340 always renders the second virtual camera space image 7 into the display object 10.

After the rendering timing determining unit 340 determines the predetermined timing at which the second virtual camera space image 7 is rendered, the object rendering unit 350 reads the second virtual camera space image 7 from the image storing unit 420 to render the second virtual camera space image 7 into the display object 10 at the predetermined timing (Step S10). At this time, the object rendering unit 350 performs rendering of only the display object 10 in the field-of-view region 5 specified in Step S6, and does not perform rendering of the display object outside of the field-of-view region 5.

Further, the object rendering unit 350 may determine a predetermined scene for performing rendering into the display object. The object rendering unit 350 renders, of the second camera virtual space images read from the image storing unit 420, an image corresponding to a predetermined scene to be rendered, for example, a scene from a predetermined time before a goal scene to a predetermined time after the goal is scored.

When there is a plurality of display objects 10 in the field-of-view region 5, the object rendering unit 350 renders each of the second virtual camera space images taken by the virtual camera 2 into a corresponding display object 10. At this time, as illustrated in FIG. 8, the object rendering unit 350 may render the second virtual camera space image into the part (a) of each of the display objects 10(2) and 10(3) in the field-of-view region 5. With this, the load required for the rendering processing can be reduced. Further, the object rendering unit 350 updates each of the plurality of display objects in the field-of-view region 5 at the update timings set in Step S8. The number of display objects to be updated in one frame is reduced, and the plurality of display objects is updated at different timings. In this manner, the rendering processing load required for one update can be reduced.

Then, the field-of-view image generating unit 250 refers to the space information storing unit 410 to generate the field-of-view image 8 corresponding to the field-of-view region 5 (Step S11). The space information storing unit 410 stores a three-dimensional space image of the virtual space 6. The field-of-view image generating unit 250 generates the field-of-view image 8 in which the display object present in the field-of-view region 5 is arranged in the virtual space.

Then, the HMD 110 receives the information relating to the field-of-view image 8 from the control circuit unit 120, and outputs the field-of-view image 8 to the display 112 to cause the display 112 to display the field-of-view image 8 (Step S12). The field-of-view image includes two two-dimensional images for the left eye and the right eye, and those images are superimposed on the display 112 to provide the virtual space 6 being a three-dimensional image to the user 150.

FIG. 10 is an example of the image to be displayed in the field-of-view region of the user 150 wearing the HMD. In FIG. 10, the field-of-view image 8 is included in the field-of-view region 5 set based on the reference line of sight. One display object 10 is arranged in the field-of-view image 8. In the display object 10, the second virtual camera space image 7, which is taken by the virtual camera 2 in a third-person perspective, is rendered. In at least one embodiment, when the user 150 wearing the HMD moves his/her head or line of sight, the field-of-view image 8 is changed so as to be synchronized with the movement of the head or the movement of the line of sight of the user. The field-of-view image 8 is not formed of the second virtual camera space image 7, but includes the display object 10 in which the second virtual camera space image 7 is rendered. In at least one embodiment, the second virtual camera space image is rendered into the display object 10 arranged in the virtual space. Therefore, the user wearing the HMD does not visually recognize an image entirely formed of the second virtual camera space image 7 in a third-person perspective, which is not synchronized with the movement of the HMD. According to at least one embodiment, visually induced motion sickness, which is caused when the user visually recognizes the virtual space image not synchronized with the movement of the HMD, can be suppressed.

At least one embodiment of this disclosure is described above. However, this disclosure is not limited to the at least one embodiment described above. A person skilled in the art would understand that various modifications may be made to the at least one embodiment as long as the modifications do not deviate from the spirit and scope of this disclosure described in the claims described below.

What is claimed is:

1. A method of displaying a virtual space image on a head-mounted display, the method comprising:
    generating a virtual camera space image based on a virtual camera in a virtual space, which has a third person perspective different from a first person perspective associated with the user, wherein generating the virtual camera space comprises generating the virtual camera space based on a plurality of virtual cameras, which are arranged at different positions in the virtual space;
    rendering the virtual camera space image into a display object in the virtual space, wherein rendering the virtual camera space image into the display object comprises rendering the virtual camera space image into a plurality of display objects, which are arranged at different positions in the virtual space, and wherein each of the plurality of display objects is associated with a corresponding virtual camera of the plurality of virtual cameras;
    generating a field-of-view image in which the display object is arranged in the virtual space;
    outputting the field-of-view image to the head-mounted display;
    specifying a reference line of sight of the user; and
    determining a field-of-view region based on the reference line of sight, wherein the virtual camera space image is rendered into a first display object of the plurality of display objects arranged in the field-of-view region.

2. The method according to claim 1, further comprising:
    determining a timing at which the virtual camera space image is rendered; and
    rendering the virtual camera space image into the display object at the timing.

3. The method according to claim 1, wherein the rendering of the virtual camera space image into the display object is carried out based on a determination that the virtual camera space image corresponds to a predetermined scene for performing rendering into the display object.

4. The method according to claim 1, wherein the virtual camera space image is prevented from being rendered into a second display object of the plurality of display objects arranged outside of the field-of-view region.

5. The method according to claim 1, further comprising updating, when there are a plurality of display objects in the field-of-view region, each of the plurality of display objects in the field-of-view region at different timings.

6. The method according to claim 1, wherein the specifying of the reference line of sight of the user is carried out based on at least one of an inclination of the head-mounted display or a line-of-sight direction of the user.

7. The method according to claim 6, wherein the line of sight direction is specified by an eye gaze sensor of the head-mounted display.

8. A system for displaying a virtual space image on a head-mounted display, the system comprising:
    a memory for storing instructions; and a processing unit connected to the memory, wherein the processing unit is configured to execute the instructions for:
generating a virtual camera space image based on a virtual camera in a virtual space, which has a third person perspective different from a first person perspective associated with the user, wherein generating the virtual camera space comprises generating the virtual camera space based on a plurality of virtual cameras, which are arranged at different positions in the virtual space;
rendering the virtual camera space image into a display object in the virtual space, wherein rendering the virtual camera space image into the display object comprises rendering the virtual camera space image into a plurality of display objects, which are arranged at different positions in the virtual space, and wherein each of the plurality of display objects is associated with a corresponding virtual camera of the plurality of virtual cameras;
generating a field-of-view image in which the display object is arranged in the virtual space;
outputting the field-of-view image to the head-mounted display;
specifying a reference line of sight of the user; and
determining a field-of-view region based on the reference line of sight, wherein the virtual camera space image is rendered into a first display object of the plurality of display objects arranged in the field-of-view region.

9. The system according to claim 8, wherein the processing unit is further configured to
execute the instructions for: determining a timing at which the virtual camera space image is rendered; and
rendering the virtual camera space image into the display object at the timing.

10. The system according to claim 8, wherein the processing unit is configured to render the virtual camera space image into the display object out based on a determination that the virtual camera space image corresponds to a predetermined scene for performing rendering into the display object.

11. The system according to claim 8, wherein the processing unit is configured to prevent the virtual camera space image from being rendered into a second display object of the plurality of display objects arranged outside of the field-of-view region.

12. The system according to claim 8, wherein the processing unit is further configured to execute the instructions for updating, when there are a plurality of display objects in the field-of-view region, each of the plurality of display objects in the field-of-view region at different timings.

13. The system according to claim 8, wherein the processing unit is configured to specify the reference line of sight of the user based on at least one of an inclination of the head-mounted display or a line-of-sight direction of the user.

14. The method according to claim 13, wherein the processing unit is configured to specify the line of sight direction using information from an eye gaze sensor of the head-mounted display.

15. A method of displaying a virtual space image on a head-mounted display, the method comprising:
generating a virtual camera space image based on a virtual camera in a virtual space, which has a perspective different from a perspective associated with the user;
rendering the virtual camera space image into a display object in the virtual space;
generating a field-of-view image in which the display object is arranged in the virtual space;
outputting the field-of-view image to the head-mounted display;
generating the virtual camera space comprises generating the virtual camera space based on a plurality of virtual cameras, which are arranged at different positions in the virtual space, wherein
rendering the virtual camera space image into the display object comprises rendering the virtual camera space image into a plurality of display objects, which are arranged at different positions in the virtual space, and wherein each of the plurality of display objects is associated with a corresponding virtual camera of the plurality of virtual cameras;
specifying a reference line of sight of the user; and
determining a field-of-view region based on the reference line of sight, wherein the virtual camera space image is rendered into a first display object of the plurality of display objects arranged in the field-of-view region,
wherein the virtual camera space image is prevented from being rendered into a second display object of the plurality of display objects arranged outside of the field-of-view region.

* * * * *